US012129924B2

(12) United States Patent
Yildiz

(10) Patent No.: US 12,129,924 B2
(45) Date of Patent: Oct. 29, 2024

(54) CONTROL MECHANISM DEVELOPED FOR CONTINUOUSLY VARIABLE TRANSMISSION (CVT)SYSTEM

(71) Applicant: SANVER MÜHENDISLIK ELEKTRIK ELEKTRONIK BILGISAYAR SISTEMLERI MAKINA SANAYI VE TICARET LIMITED SIRKETI, Bursa (TR)

(72) Inventor: Ahmet Yildiz, Bursa (TR)

(73) Assignee: SANVER MUHENDISLIK ELEKTRIK ELEKTRONIK BILGISAYAR SISTEMLERI MAKINA SANAYI VE TICARET LIMITED SIRKETI

( * ) Notice: Subject to any disclaimer, the term of this patent is extended or adjusted under 35 U.S.C. 154(b) by 0 days.

(21) Appl. No.: 18/012,232

(22) PCT Filed: May 7, 2021

(86) PCT No.: PCT/TR2021/050439
§ 371 (c)(1),
(2) Date: Dec. 22, 2022

(87) PCT Pub. No.: WO2022/066118
PCT Pub. Date: Mar. 31, 2022

(65) Prior Publication Data
US 2023/0313884 A1 Oct. 5, 2023

(30) Foreign Application Priority Data

Sep. 28, 2020 (TR) .................. 2020/15361

(51) Int. Cl.
*F16H 61/32* (2006.01)
*F16H 61/662* (2006.01)
*F16H 61/28* (2006.01)

(52) U.S. Cl.
CPC .......... *F16H 61/662* (2013.01); *F16H 61/32* (2013.01); *F16H 2061/2892* (2013.01); *F16H 2061/66295* (2013.01)

(58) Field of Classification Search
CPC ........... F16H 61/662; F16H 61/32; F16H 7/02
See application file for complete search history.

(56) References Cited

U.S. PATENT DOCUMENTS

| 3,385,124 | A * | 5/1968 | Araki ................... D01H 1/365 474/71 |
| 9,651,150 | B2 * | 5/2017 | Wang ................ F16H 61/66236 |
| 9,958,064 | B2 * | 5/2018 | Tay ........................ F16H 63/065 |
| 2011/0277577 | A1 * | 11/2011 | Roberge ................ B60W 10/06 74/473.1 |
| 2018/0073623 | A1 | 3/2018 | Ninomiya et al. |

FOREIGN PATENT DOCUMENTS

JP        0650426 A    2/1994
JP    2005003142 A    1/2005

* cited by examiner

*Primary Examiner* — Derek D Knight
(74) *Attorney, Agent, or Firm* — Jose Cherson Weissbrot

(57) ABSTRACT

The invention relates to the control mechanism developed for continuously variable transmission systems which are chain/belt-driven and which are used in the vehicles with electrical, hybrid and conventional internal combustion engine as an automatic gearbox system in the automotive industry.

7 Claims, 2 Drawing Sheets

CONTROL MECHANISM DEVELOPED FOR CONTINUOUSLY VARIABLE TRANSMISSION (CVT) SYSTEM

TECHNICAL FIELD

Figure 1:
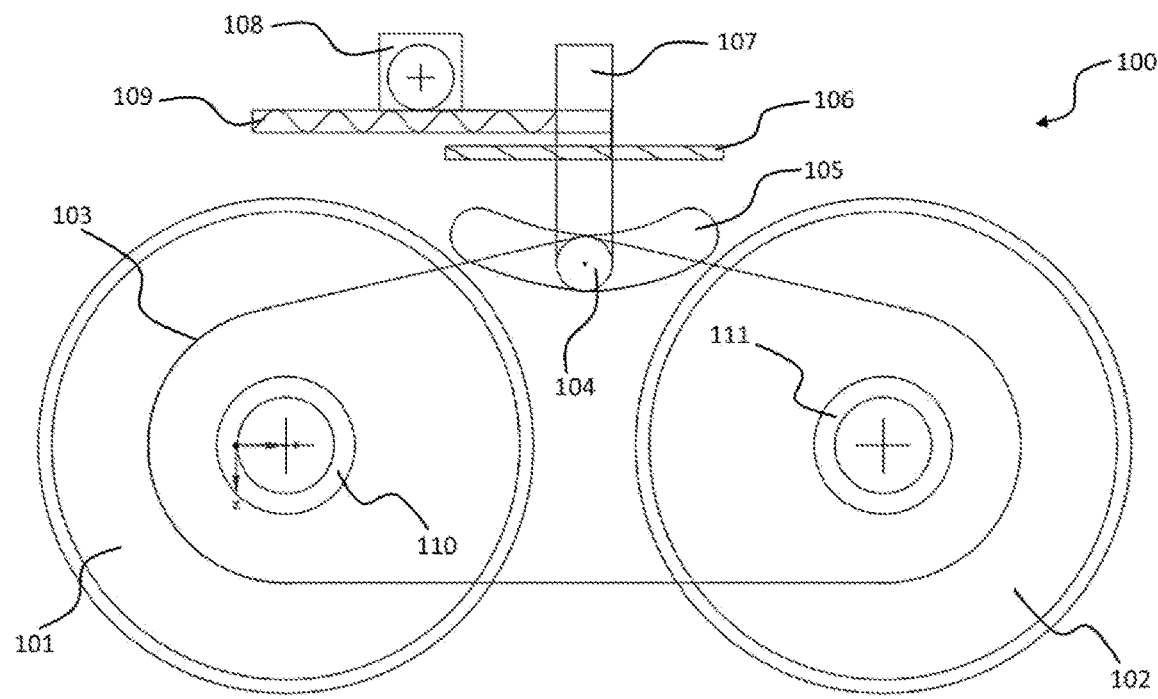

The invention relates to a control mechanism developed for continuously variable transmission (SDA, CVT) system which find application area generally in the automotive industry, machinery, aviation, space and robotics industries.

The invention particularly relates to the control mechanism developed for continuously variable transmission systems which are chain/belt-driven and which are used in the vehicles with electrical, hybrid and conventional internal combustion engine as an automatic gearbox system in the automotive industry.

STATE OF THE ART

In today, Continuous Variable Transmission (SDA, CVT) systems find application in many areas, particularly in the automotive industry, machinery, aviation, space and robotics industries. Especially in the automotive sector, it finds application in conventional internal combustion vehicles as well as in both electric and hybrid vehicles as an automatic gearbox system. It is known that CVT systems, which provide significant fuel-efficiency, therefore low emission of harmful gas compared to the automatic and manual gearboxes which use conventional gears in the vehicles, have important advantages such as silent operation and partially high acceleration. Therefore, usage areas are increasing with each passing day. Besides, it is often used in motorcycles, ATVs, and small electric vehicles which require speed and torque change.

Continuous Variable Transmission (CVT, SDA as in Turkish) systems in the prior art are power transmission organs that transmit the power from the input part to the output part uninterruptedly, non-gradually and continuously. In these systems, the cycle ratio or gear ratio is not a fixed value, rather it is a theoretically unlimited number within a particular range. CVT system is able to change this ratio uninterruptedly and non-gradually. This flexibility in the system makes possible the power transmission is performed in a larger cycle rate by taking intermediate values compared to the fixed cycle ratio values in conventional systems. There are many types of continuously variable transmission systems. The methods of Continuous Variable Transmission (CVT) power transmission are classified as hydraulic, mechanical and electrical. And the methods of mechanical power transmission are classified in its entirety as pulley driven (Chain/Belt-driven) and disc-toroidal driven (Half Torus-Full Torus).

In the current systems of the prior art, the gear shifting of the chain/belt-driven continuously variable transmission (CVT) systems is generally performed by means of the hydraulic pressure. A hydraulic unit consisting of a hydraulic pump, a hydraulic cylinder on the pulleys and hydraulic oil and reservoir required therefor is needed for this kind of control. While this unit increases the weight, it requires a continuous pressure energy to control the system. Therefore, there are disadvantages with regard to these control systems for both cost and energy loss.

The drawbacks of the abovementioned system and the technical problems emerged from these applications can be summarized as follows; the weight and cost due to the requirement of the hydraulic power unit, the requirement of heating of the hydraulic oil and of cooling and maintenance thereof, the energy loss of the hydraulic pump caused by keeping thereof under constant pressure for control.

In the prior art the Patent Application No. TR2018/15985 states that in technical context thereof; the invention relates to a bladeless hybrid vehicle which can carry passengers and loads in the air and on land, which can take-off and land vertically, through transmitting power from an internal combustion central motor or group of motors to the groups of propellers and wheels by means of a continuously variable transmission system (CVT). Said patent application aims to transmit a continuously variable transmission system to the groups of propeller and wheel of the hybrid vehicles without blades which is able to carry loads, thus enable the vehicle to take-off and land vertically; however, said application does not provide an embodiment in which power transmission is provided with only one servo motor. With this in mind, said application does not comprise a control mechanism which overcomes problems such as high maintenance costs and weight.

In the prior art the Patent Application No. TR2017/00079 states that in technical context thereof; the invention is related to the continuously variable transmission with gear ratio (CVT—Continuously Variable Transmission). Said application comprises hydraulic cylinders, hydraulic pressure and generally a hydraulic unit. As stated in the prior art said application involves the problems such as heating hydraulic oil, high maintenance cost and weight.

In the prior art the Patent Application No. TR2017/00079 states that in technical context thereof; the invention relates to electric phaeton supported with solar panel and CVT gearbox. Said application involves supporting phaetons with the solar panels with CVT gearbox. Said application not only does not provide an embodiment in which power transmission is provided with only one servo motor, also does not propose a control mechanism in the field for enabling a mechanical solution towards producing power transmission instead of with a hydraulic power unit.

As a result, there is still need for improvement in control mechanisms used in Continuously Variable Transmission (SDA, CVT) systems, therefore there is a need for novel embodiments which overcomes the abovementioned disadvantages and provides solution to current systems.

DESCRIPTION OF THE INVENTION

The invention relates to Continuously Variable Transmission (SDA, CVT) systems which covers foregoing requirements, which eliminates all the disadvantages and which brings novel advantages.

The main aim of the invention is to provide a power transmission with only one servo motor in order to ensure that the power transmission control of Continuous Variable Transmission (CVT) systems is produced with a mechanical solution instead of a hydraulic power unit.

An aim of the invention is to overcome problems such as heating of the hydraulic oil, high maintenance cost and weight since there is no longer individual parts needed, such as hydraulic cylinders for the inlet and outlet pulleys, valves for setting hydraulic pressure and hydraulic power unit.

Another aim of the invention is to perform compression of the pulleys for preventing the chain from slipping between the pulleys.

Another aim of the invention is to provide mechanical compression force to the system by means of a mechanical spring which is more inflexible than the springs used in the hydraulic systems to prevent sliding while idling, without an additional cost and weight.

Yet another object of the invention is to provide setting gear ratios by means of a control mechanism which is cost-efficient, simple to control, which carries no oil maintenance and heating problems and which is lighter.

In order to performed all the above mentioned advantages which will be understood from the detailed description below, the present invention aims to provide a control mechanism comprising input pulley that transmits the torque from the input to the output part over the transmission element, the output pulley that transmits the torque transmitted by the transmission element to the related machine element over the output shaft, power transmission element that transmits the torque from the input pulley to the output pulley; in order to ensure transmitting the power from the input part to the output part uninterruptedly, non-gradually and continuously by means of the Continuous Variable Transmission (SDA, CVT) systems, wherein control mechanism comprises a control arm enabling gear shifting in the continuously variable transmission system, a drive element enabling determining the gear ratio by thrusting the control arm back and forth, a control roller thrusted by the drive element to control the position of the transmission element, a control arm trajectory thrusted by the drive element to determine the cycle ratio of the continuously variable transmission, control arm bearing enabling bearing of the control arm from top, an drive arm enabling the movement of the control arm through converting the thrust rotation movement from the drive element into the thrust movement, input pressure spring enabling the non-slidable rotation of the transmission element by pressing the contact points of the transmission element between the input pulleys, output pressure spring enabling the non-slidable rotation of the transmission element by pressing the contact points of the transmission element between the output pulleys.

The structural and characteristic features and all the advantages of the invention will be understood more clearly by reference to the following figures and the detailed explanation thereof. Therefore, the evaluation should be made by taking these figures and detailed explanations into consideration.

FIGURES FOR A BETTER UNDERSTANDING OF THE INVENTION

The present invention should be evaluated together with the figures explained below, in order to better understand the embodiment of the invention and its advantages with the additional elements.

FIG. 1; two-dimensional view of the continuously variable transmission control mechanism according to the invention in equilibrium.

Figure 2:
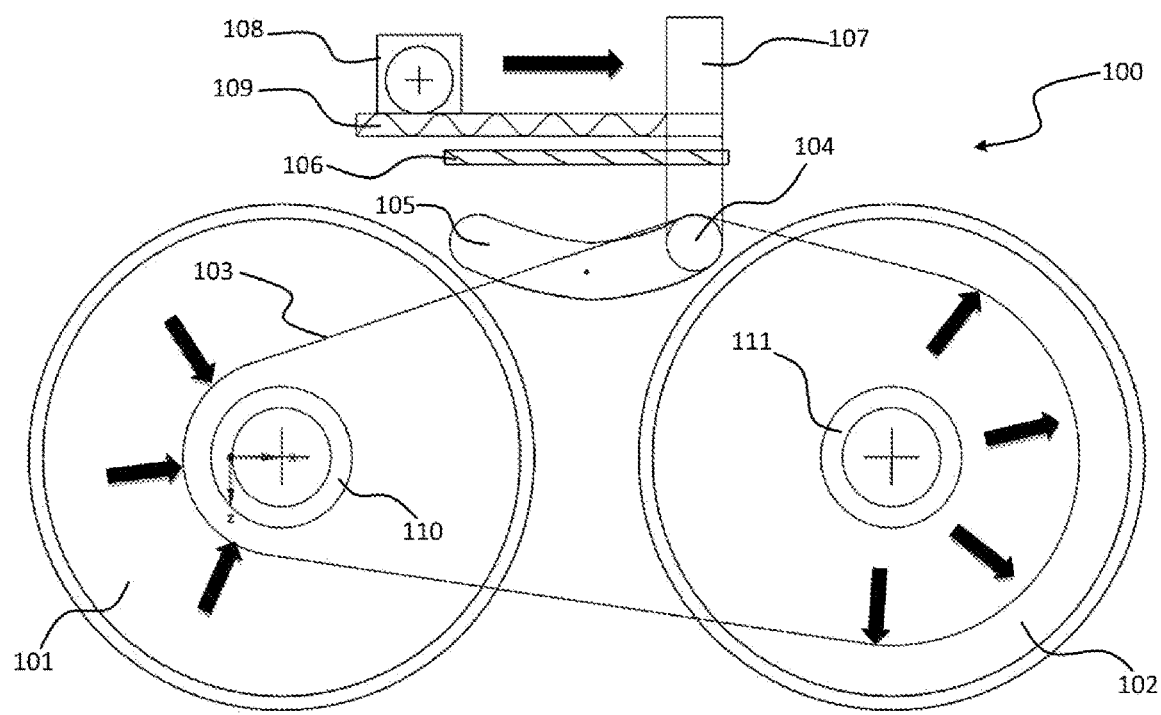

FIG. 2 two-dimensional view of the continuously variable transmission control mechanism according to the invention with reduced output speed.

Figure 3:
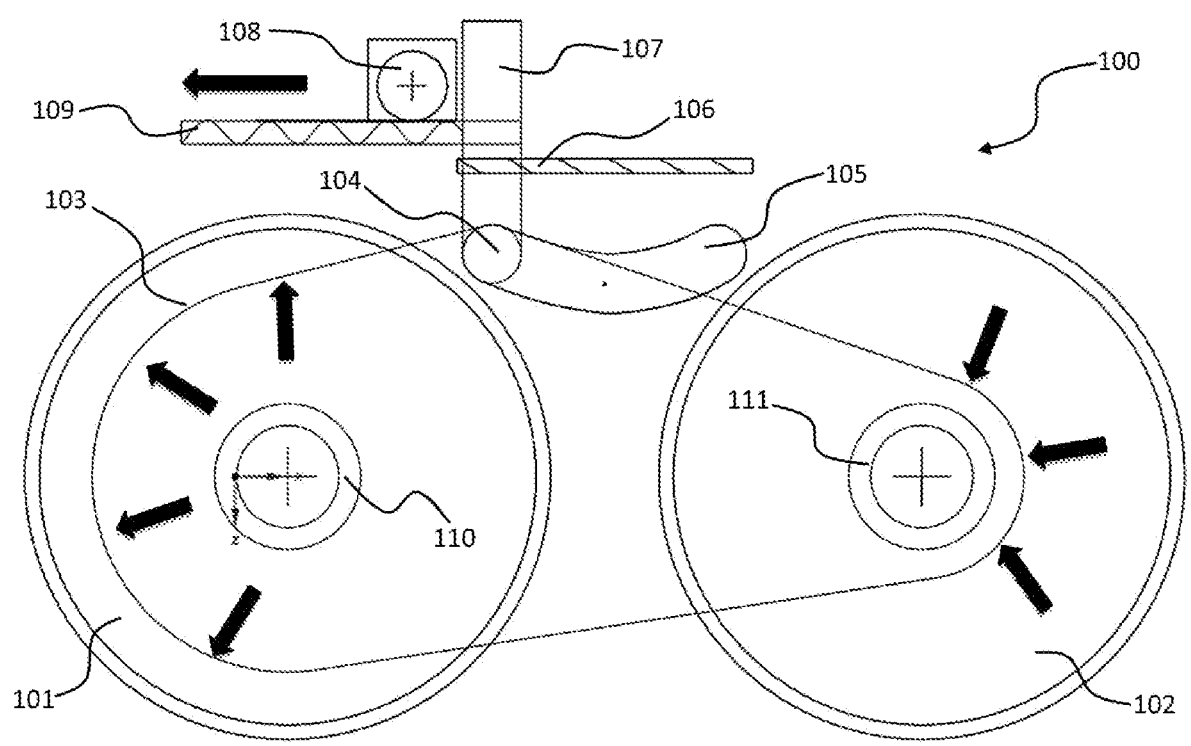

FIG. 3 two-dimensional view of the continuously variable transmission control mechanism according to the invention with increased output speed.

LIST OF REFERENCE NUMBERS

100—Control mechanism
101—Input pulley
102—Output pulley
103—Transmission element
104—Control roller
105—Control arm trajectory
106—Control arm bearing
107—Control arm
108—Drive element
109—Drive arm
110—Input pressure spring
111—Output pressure spring

DETAILED DESCRIPTION OF THE INVENTION

The invention enables providing a power transmission with only one servo motor in order to ensure that the power transmission control of Continuous Variable Transmission (CVT) systems is produced with a mechanical solution instead of a hydraulic power unit.

In order to ensure transmitting the power from the input part to the output part uninterruptedly, non-gradually and continuously by means of the Continuous Variable Transmission (SDA, CVT) systems, there is provided an input pulley (101) that transmits the torque from the input to the output part over a transmission element (103). An output pulley (102) transmits the torque transmitted by the transmission element (103) to the related machine element over the output shaft. Power transmission element (103) which is selected as chain-belt transmits the torque from the input pulley (101) to the output pulley (102).

Control arm (107) provides gear shifting in the continuous variable transmission system. The drive element (108) selected as servo motor provides determining the gear ratio by thrusting the control arm back and forth There is provided the control roller (104) thrusted by the drive element (108) to control the position of the transmission element (103). There is provided a control arm trajectory (105) thrusted by the drive element (108) to determine the cycle ratio of the continuously variable transmission. A control arm bearing (106) enables bearing of the control arm (107) from top. There is provided the drive arm (109) enabling the movement of the control arm (107) through converting the thrust rotation movement from the drive element (108) into the thrust movement. Said drive arm (109) is preferably a worm gear. Input pressure spring (110) enables the non-slidable rotation of the transmission element by pressing the contact points of the transmission element (103) between the input pulleys (101). An output pressure spring (111) enables the non-slidable rotation of the transmission element by pressing the contact points of the transmission element (103) between the output pulleys (102).

A control method providing transmitting the power from the input part to the output part uninterruptedly, non-gradually and continuously by means of the Continuous Variable Transmission (SDA, CVT) systems, wherein; it comprises the steps of determining gear ratio by means of drive element (108) in the Continuous Variable Transmission (CVT) system, moving the drive arm (109) back and forth by rotating drive element (108) in different directions, moving the control arm (107) in trajectory (105) as a result of the back and forth movement of the drive arm (109), raising or lowering of the chain by forcing the chain/belt of the continuously variable transmission system such that the roller (104) moves to follow the trajectory (105) with the movement of the control arm (107) in the trajectory (105). The control roller (104) which is a protrusion of said control arm (107), is preferably an external roller.

Continuous Variable Transmission (SDA, CVT) control mechanism according to the invention has an operation principle as follows;

FIG. 1 shows two-dimensional view of the Continuously Variable Transmission control mechanism (100) according to the invention in equilibrium. As shown in the figure, the drive element (108), selected as a servo motor is used for CVT gear ratio control. Thanks to said motor (108), it is provided to control the position of the chain and belt, and mechanically determine the gear ratio. In order to achieve this, it is provided to move the drive arm (109) back and forth with respect to the rotation direction of the servo motor (108), and to move the control arm (107) within the bearing (106).

FIG. 2 shows two-dimensional view of the continuously variable transmission control mechanism (100) according to the invention with reduced output speed. In a case where the control arm (107) is thrusted forward, the pulley (104) is moved to the right in the trajectory (105). As a result of this movement, transmission element (103), selected as chain/belt widens along the right output pulley (102) and the radius of contact thereof increases. Since the length of the chain/belt is fixed, the distance between the left pulleys (101) becomes larger and the chain/belt, namely the transmission element (103) moves downward. At the same time, the distance between the right output pulleys (102) becomes smaller and the area of the chain/belt on this side moves upward. Therefore, the cycle ratio of the CVT system has altered and speed on the outlet part is reduced thus the torque is increased. As a result of this, the compression springs (110) (111) which makes the chain/belt non-slidable will be compressed and expanded, respectively.

FIG. 3 shows two-dimensional view of the continuously variable transmission control mechanism (100) according to the invention with increased output speed. Similarly, thanks to the servo motor (108), the control arm (107) is thrusted to the left in order to increase the speed of the CVT system on the outlet side and the position of the chain/pulley between the pulleys (101) is changed such that it is the opposite of the abovementioned position and gear ratio is changed thus output speed is increased.

Therefore, the gear (cycle) ratio of the CVT system is adjusted by continuously changing the position of the chain/belt with regard to the rotation angle of the servo motor (108) based on the trajectory (105) such that the ratio remains within the determined maximum and minimum values. The change limits and the change of positions thereof is controlled by the motor (108) through a control algorithm.

What is claimed is:

1. A control mechanism for transmitting a power from an input part to an output part uninterruptedly, non-gradually and continuously by means of a Continuous Variable Transmission (SDA, CVT) systems, it comprises;
   an input pulley (101) that transmits athe torque from the input to the output part over a transmission element (103),
   an output pulley (102) that transmits the torque transmitted by the transmission element (103) to a related machine element over an output shaft,
   the transmission element (103) that transmits torque from the input pulley (101) to the output pulley (102), characterized by comprising;
   a control arm (107) providing gear shifting in the continuous variable transmission system,
   a drive element (108) providing determining the gear ratio by thrusting the control arm (107) back and forth,
   a control roller (104) which is a protrusion of the control arm (107), and which is thrusted by the drive element (108) to control a position of the transmission element (103),
   a control arm trajectory (105) thrusted by the drive element (108) to determine a cycle ratio of the continuously variable transmission,
   a control arm bearing (106) providing bearing of the control arm (107) from top,
   a drive arm (109) providing a movement of the control arm (107) through converting a rotation movement from the drive element into a thrust movement
   an input pressure spring (110) providing a non-slidable rotation of the transmission element by pressing a plurality of contact points of the transmission element (103) between the input pulley (101),
   an output pressure spring (111) enables the non-slidable rotation of the transmission element by pressing the plurality of contact points of the transmission element (103) between the output pulleys (102).

2. The control mechanism (100) according to claim 1, comprising; the drive element (108), which provides determining the gear ratio by thrusting the control arm (107) back and forth, is selected as a servo motor.

3. The DA control mechanism (100) according to claim 1, comprising; said drive arm (108), which provides movement of the control arm (107) is a worm gear.

4. The control mechanism (100) according to claim 1, comprising; said control roller (104) is a roller.

5. The control mechanism (100) according to claim 1, comprising; said transmission element (103) is chain or belt.

6. A control method for transmitting a power from an input part to an output part uninterruptedly, non-gradually and continuously by means of a Continuous Variable Transmission (SDA, CVT) systems, comprising; of;
   determining a gear ratio mechanically by a drive element (108) in the Continuous Variable Transmission (CVT) system,
   moving a drive arm (109) back and forth by rotating the drive element (108) in different directions,
   moving a control arm (107) in trajectory (105) as a result of the back-and-forth movement of the drive arm (109).

7. The control method for transmitting the power from the input part to the output part uninterruptedly, non-gradually and continuously by means of the Continuous Variable Transmission (SDA, CVT) systems according to claim 6, comprising; raising or lowering of the chain by forcing the chain/belt of the continuously variable transmission system such that athe control roller (104) moves to follow the control arm trajectory (105) with the movement of the control arm (107) along the trajectory (105).

* * * * *